United States Patent Office 3,413,305
Patented Nov. 26, 1968

3,413,305
2 - PHENYL - 3[PARA(β - PYRROLIDINO ETHOXY)-PHENYL]-6-METHOXY BENZO[b]THIOPHENE
Ronnie R. Crenshaw, De Witt, N.Y., assignor to Bristol-Myers Company, New York, N.Y., a corporation of Delaware
No Drawing. Continuation-in-part of application Ser. No. 457,827, May 21, 1965. This application Feb. 12, 1968, Ser. No. 704,544
4 Claims. (Cl. 260—326.5)

ABSTRACT OF THE DISCLOSURE

The compound of the formula

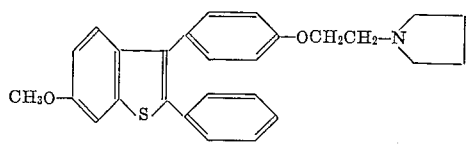

and the pharmaceutically acceptable nontoxic salts thereof exhibit antifertility activity and are useful as oral antifertility agents in mammals.

CROSS-REFERENCE TO RELATED APPLICATION

This application is a continuation-in-part of my prior, co-pending application Ser. No. 457,827 filed May 21, 1965, now abandoned.

BACKGROUND OF THE INVENTION (1) Field of the invention.—This invention relates to novel compounds. More particularly this invention relates to novel compounds which possess valuable utility as oral antifertility agents.

(2) Description of the prior art.—There exists a need to provide additional agents useful as antifertility agents and in particular nonsteroidal antifertility agents. Thus it is an object of this invention to provide novel nonsteroidal compounds having antifertility activity.

SUMMARY OF THE INVENTION

The above and other objects which may appear as the specification proceeds are achieved by this invention which comprises the provision of the compound having the formula (I)

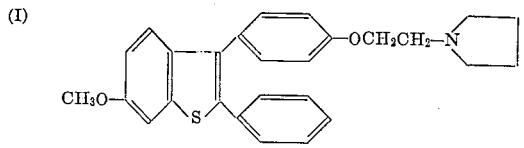

and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, glycolic, citric, maleic, phosphoric, succinic, acetic, nitric and the like.

The compounds of this invention are valuable pharmaceutical agents. They possess antifertiilty activity and are orally active antifertility agents in mammals. The compounds are useful in controlling the rodent population, e.g., mice, rats, etc.

The antifertility tests of the compounds of the present invention were carried out on mice. The compounds were administered orally to adult female mice for six days. A single dose was administered three days before mating and single doses were administered daily for five days during mating. The mice were sacrificed on the eleventh day following mating and their uteri examined for implantation sites. The absence of implantation sites in the uteri indicated that pregnancy was completely inhibited. When, for example 6-methoxy-3-{p-[2-(N-pyrrolidyl) ethoxy]phenyl}-2-phenylbenzo[b] thiophene hydrobromide, was administered orally at doses as low as 0.1 mgm./kg./day, no implantation sites were observed in any of the mice tested; hence, pregnancy was completely inhibited in each of the mice.

The compounds of the present invention are prepared by the following series of reactions:

Step A.—An aromatic thiol of the formula (II)

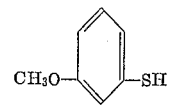

is added to a solution of sodium in alcohol and then reacted with an α-halo ketone of the formula

III)

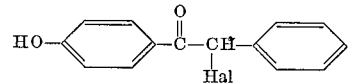

wherein Hal is chloro, bromo or iodo in the presence of a non-reactive solvent, e.g., chloroform, and heated at reflux to produce a benzyl ketone of the formula (IV)

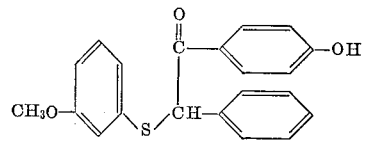

Step B.—The benzyl ketone prepared in Step A is cyclized by treatment with a Lewis acid such as hydrogen fluoride, aluminum chloride, ferric chloride, zinc chloride, phosphoric pentoxide, polyphosphoric acid and the like, to produce a compound of the formula (V)

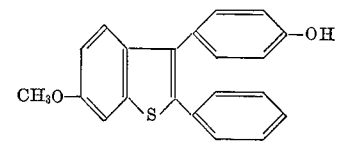

Reaction of the compound of Formula V with a compound of the formula (VI)

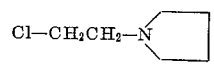

produces the compound of Formula I.

The aromatic thiol of Formula II may be prepared by a variety of procedures well known in the art. For example, it may be prepared by reduction of the corresponding sulfonyl chloride; from treatment of the corresponding aryl magnesium halide (Grignard reagents) or aryl lithium compounds, with elemental sulfur; or from the conversion of corresponding aryl amines to diazonium salts and subsequent treatment with potassium ethyl xanthate, sodium hydrosulfide, or the like, followed by hydrolysis. Methods of the preparation of the aromatic thiols are described by G. Perold and P. van Lingen, Chem. Ber., 92, 296 (1959).

The α-halo ketones of Formula III also may be prepared from procedures will known in the art. For example, they may be prepared by treatment of the parent ketone, i.e., the compound having the formula (VII)

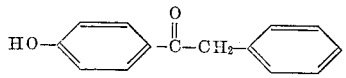

with bromine, chlorine, iodine, N-bromosuccinimide, N-chlorosuccinimide, sufuryl chloride or the like, in an inert solvent. Also they may be prepared by use of a procedure recently described [L. C. King and G. K. Ostrumm, Journal Organic Chemistry, 29, p. 3459 (1964)] which employs cupric bromide. Methods for the preparation of α-halo ketones are also described by S. Jenkins, Journal American Chemical Society, 56, p. 682 (1934).

Many methods of preparation of the parent ketone of Formula VII are described in the literature.

The compound of Formula I may be administered as the free base or in the form of its nontoxic addition salts. The compounds of this invention may be compounded and formulated into pharmaceutical preparations in unit dosage form for oral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compounds of this invention when administered orally, in an effective amount, are effective in the inhibition of pregnancy in mammals. The usual daily dosage is from about 0.1 to 200 mgm./kg.

For the control of rodents the compounds of this invention are conveniently mixed with rodent feed. Thus the compounds are administered to the rodent orally with the feed. A daily dosage of from about 0.1 to 200 mgm./kg. is effective in inhibiting pregnancy and thereby controlling the rodent population.

The following examples are intended to illustrate the invention described herein without unduly restricting it.

Example 1.—Preparation of 4-hydroxyphenyl α-(3-methoxyphenylthio)benzyl ketone

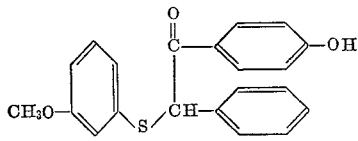

A solution of m-methoxythiophenol (7.58 gm.) in absolute ethanol (25 ml.) was added to a solution of sodium (1.24 gm.) in absolute ethanol (54 ml.). The neutral solution then was mixed with a solution of p-hydroxyphenyl α-bromobenzyl ketone (M.P. 162–163.5° C.) (15 gm.) in chloroform (50 ml.) and dry tetrahydrofuran (35 ml.) and the resultant mixture heated at reflux for 3 hours.

The precipitated sodium bromide was removed and the solvent was replaced by ether. The ethereal solution was washed with aqueous sodium hydroxide and then with water. After drying over magnesium sulfate and removal of the ether, there was obtained 4-hydroxyphenyl α-(3-methoxyphenylthio)benzyl ketone as a crystalline solid, M.P. 142–143° C. (recrystallization from aqueous ethanol).

*Analysis.*—Calcd. for $C_{21}H_{18}O_3S$: C, 71.98%; H, 5.18%. Found: C, 71.81%; H, 5.17%.

Example 2.—Preparation of 6-methoxy-3-(p-hydroxyphenyl)-2-phenylbenzo[b]thiophene

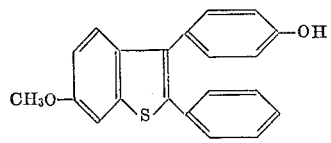

A mixture of 4-hydroxyphenyl α-(3-methoxyphenylthio)benzyl ketone (12.3 gm.) and polyphosphoric acid (256 gm.) was heated at 90° C. for 1 hour. The mixture then was poured onto ice-water and extracted with chloroform. The chloroform extracts were washed with water, dried, and then evaporated to give the product, 6-methoxy-3 - (p - hydroxyphenyl) - 2 - phenylbenzo[b]thiophene, (8.3 gm.), M.P. 177–179° C. (benzene).

*Analysis.*—Calc'd for $C_{21}H_{16}O_2S$: C, 75.88%; H, 4.85%; S, 9.65%. Found: C, 76.26%; H, 4.88%; S, 9.52%.

Example 3.—Preparation of 6-methoxy-3-{p-[2-(N-pyrrolidyl) - ethoxy]phenyl}-2 - phenylbenzo[b]thiophene hydrobromide

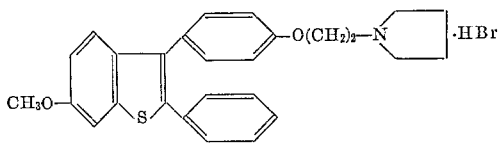

Sodium hydride (1.18 gm. of 58.6% dispersion in oil) was added to a solution of 6-methoxy-3-(p-hydroxyphenyl) - 2 - phenylbenzo[b]thiopene (8.90 gm.) in dimethylformamide (100 ml.). The mixture was stirred until all of the hydride had reacted.

N-(β-chloroethyl)pyrrolidine (0.108 mol) in dimethylformamide (20 ml.) was added, and the mixture was maintained at 50° C. for 1 hour; then at 27° C. for 18 hours.

The mixture was cooled, diluted with ethanol (3 ml.), and then filtered. The solvents were removed under reduced pressure, and the residue was dissolved in chloroform. The chloroform solution was washed with aqueous 1 N sodium hydroxide, water, and then evaporated. The residue was triturated under aqueous 1 N hydrobromic acid (200 ml.), and the resultant solid hydrobromide was extracted into chloroform.

The chloroform solution was dried and evaporated to leave a residue which was rubbed under ethyl acetate to yield crystalline 6 - methoxy - 3 - {p - [2-(N-pyrrolyidyl) ethoxy]phenyl} - 2 - phenylbenzo[b]thiophene hydrobromide (8.25 gm.). Recrystallizations from methylene chloride-ethyl acetate gave material of constant M.P. 186–189° C.

*Analysis.*—Calc'd for $C_{27}H_{28}BrNO_2S$: C, 63.52%; H, 5.52%; Br, 15.65%; N, 2.74%; S, 6.28%. Found: C, 63.50%; H, 5.65%; Br, 15.81%; N, 2.49%; S, 6.40%.

Example 4.—Preparation of 6-methoxy-3-{p-[2-(N-pyrrolidyl)-ethoxy]phenyl} - 2 - phenylbenzo[b]thiophene hydrochloride

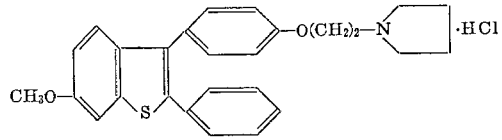

Sodium hydride (0.37 gm. of 58.6% dispersion in oil) was added to a solution of 6-methoxy-3-(p-hydroxyphenyl) - 2 - phenylbenzo[b]thiophene (3.00 gm.) in dimethylformamide (40 ml.). The mixture was stirred at 30° C. for 20 minutes and then additional sodium hydride (0.59 gm. of 58.6% dispersion) was added.

The mixture was maintained at 30° C. while a solution of N-(β-chloroethyl)pyrrolidine hydrochloride (2.33 gm.) in dimethylformamide (18 ml.) was added slowly. The resultant mixture was heated at 55° C. for 4 hours.

The mixture was cooled, diluted with water and the solvent removed in vacuo. The residue was dissolved in chloroform, and the solution was washed with aqueous sodium hydroxide, water and then evaporated. The residue was triturated under warm aqueous 1 N hydrochloric acid, and the resultant solid hydrochloride was extracted into chloroform.

The chloroform solution was dried and evaporated to leave the product, 6 - methoxy - 3 - {p-[2-(N-pyrrolidyl) ethoxy]phenyl} - 2 - phenylbenzo[b]thiophene hydrochloride, as a solid. The product was extracted in succession with "Skellysolve B" and diethyl ether, and then was recrystallized from a mixture of 2-propanol and diethyl ether to give the product, M.P. 187–194° C.

I claim:
1. A compound selected from the group consisting of the compound of the formula

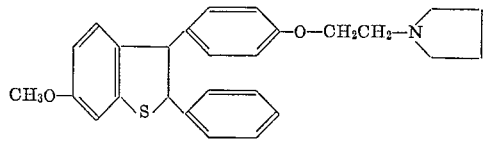

and the pharmaceutically acceptable nontoxic acid addition salts thereof.

2. The compound of claim 1 having the formula

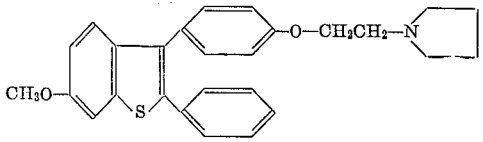

3. The hydrobromide salt of the compound of claim 2.
4. The hydrochloride salt of the compound of claim 2.

No references cited.

NICHOLAS S. RIZZO, *Primary Examiner.*
JOSÉ TOVAR, *Assistant Examiner.*